United States Patent
Boisset et al.

(10) Patent No.: US 11,199,402 B2
(45) Date of Patent: Dec. 14, 2021

(54) METHOD FOR DETERMINING THE THICKNESS OF A MOTOR VEHICLE TIRE

(71) Applicants: Continental Automotive France, Toulouse (FR); Continental Automotive GmbH, Hannover (DE)

(72) Inventors: Jean-Philippe Boisset, Montauban (FR); Sébastien Plancke, Tournefeuille (FR); Matthias Kretschmann, Wenzenbach (DE)

(73) Assignees: CONTINENTAL AUTOMOTIVE GMBH, Hannover (DE); CONTINENTAL AUTOMOTIVE FRANCE, Toulouse (FR)

(*) Notice: Subject to any disclaimer, the term of this patent is extended or adjusted under 35 U.S.C. 154(b) by 63 days.

(21) Appl. No.: 16/753,997

(22) PCT Filed: Oct. 8, 2018

(86) PCT No.: PCT/FR2018/052475
§ 371 (c)(1),
(2) Date: Apr. 6, 2020

(87) PCT Pub. No.: WO2019/073155
PCT Pub. Date: Apr. 18, 2019

(65) Prior Publication Data
US 2020/0393243 A1    Dec. 17, 2020

(30) Foreign Application Priority Data
Oct. 10, 2017  (FR) ...................................... 1759466

(51) Int. Cl.
*G01M 17/02* (2006.01)
*B60C 11/24* (2006.01)
(Continued)

(52) U.S. Cl.
CPC ............ *G01B 21/08* (2013.01); *B60C 11/246* (2013.01); *B60C 23/0474* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 6,822,561 B2   11/2004 Latarnik et al.
9,764,603 B2    9/2017 Lehmann et al.
(Continued)

FOREIGN PATENT DOCUMENTS

CN    102069686 A    5/2011
CN    105008884 A   10/2015
(Continued)

OTHER PUBLICATIONS

International Search Report and Written Opinion for International Application No. PCT/FR2018/052475, dated Dec. 14, 2018, 10 pages.
(Continued)

*Primary Examiner* — Andre J Allen
(74) *Attorney, Agent, or Firm* — RantePrestia

(57) ABSTRACT

A method for determining the thickness of a tire of a motor vehicle being equipped with at least a tire pressure monitoring sensor placed in contact with the internal wall of the tire facing the tread, including the following steps: at least two successive reference times are determined; at least one instant of passage of a half-deflection angle is determined; the half-deflection angle is determined; then the value of a mean external radius, which radius is estimated in a range of angular positions, is determined; a value of a mean internal radius, which radius is estimated in a range of angular
(Continued)

positions, is determined; then the thickness of the tire being the difference between the mean external radius and the mean internal radius.

11 Claims, 2 Drawing Sheets

(51) Int. Cl.
*B60C 23/04* (2006.01)
*G01B 21/08* (2006.01)
*G01L 17/00* (2006.01)
*G01P 15/08* (2006.01)
*G01S 19/01* (2010.01)

(52) U.S. Cl.
CPC .......... *B60C 23/0488* (2013.01); *G01L 17/00* (2013.01); *G01M 17/02* (2013.01); *G01P 15/08* (2013.01); *G01S 19/01* (2013.01)

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2002; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| 9,950,576 | B2 | 4/2018 | Arai et al. |
| 10,207,551 | B2 | 2/2019 | Benbouhout et al. |
| 10,414,218 | B2 | 9/2019 | Shin et al. |
| 2003/0058118 | A1 | 3/2003 | Wilson |
| 2008/0168833 | A1* | 7/2008 | Awad .................... B60C 11/243 73/146 |
| 2016/0202147 | A1 | 7/2016 | Svantesson et al. |

FOREIGN PATENT DOCUMENTS

| CN | 105473409 A | 4/2016 | |
| CN | 106347038 A | 1/2017 | |
| DE | 102012108348 A1 | 3/2014 | |
| EP | 1240037 B1 | 3/2004 | |
| EP | 2172760 A1 | 4/2010 | |
| EP | 2853418 A1 * | 4/2015 | ............. B60C 13/00 |
| EP | 3385086 A1 * | 10/2018 | ............. G01M 17/10 |
| JP | 2011168211 A | 9/2011 | |
| WO | WO-2014202747 A1 * | 12/2014 | ............... G01B 7/26 |
| WO | WO-2015011260 A1 * | 1/2015 | ............. G01M 17/02 |
| WO | 2015082054 A1 | 6/2015 | |
| WO | WO-2019241118 A1 * | 12/2019 | ............ B60C 11/243 |

OTHER PUBLICATIONS

Chinese Office Action for Chinese Application No. 201880065992.2, dated Jan. 28, 2021 with translation, 9 pages.

* cited by examiner

METHOD FOR DETERMINING THE THICKNESS OF A MOTOR VEHICLE TIRE

CROSS REFERENCE TO RELATED APPLICATIONS

This application is the U.S. National Phase Application of PCT International Application No. PCT/FR2018/052475, filed Oct. 8, 2018, which claims priority to French Patent Application No. 1759466, filed Oct. 10, 2017, the contents of such applications being incorporated by reference herein.

FIELD OF THE INVENTION

The technical field of an aspect of the invention is tires, and more particularly tire thickness measurement.

BACKGROUND OF THE INVENTION

Systems for monitoring tire pressures, also known as TPMSs (tire Pressure Monitoring Systems) have recently been rolled out on all motor vehicles following revisions to the European standards concerned with motor vehicle safety equipment.

It has thus been recognized that preventing underinflation of the tires could play a significant part in the prevention of motoring accidents.

However, tire wear is another accident risk, being able to lead to the disappearance of the reliefs on the tire tread and a reduction in grip and roadholding.

It is therefore important, in parallel with monitoring the pressure of the tires, to monitor their state of wear by means of thickness measurements.

A number of indirect methods these days allow the relative wearing of the tire to be estimated, but they entail calibrations dependent on the reference of the tire, making them complicated to deploy. Specifically, each wear-estimating device would need to be calibrated according to the tire with which the vehicle is fitted, and this would have to be done for each type of vehicle. The associated costs would therefore exceed what is commonly admissible for mass-production vehicles.

SUMMARY OF THE INVENTION

One aspect of the invention is a method for determining the thickness of a tire of a motor vehicle, the motor vehicle being equipped with a tire pressure monitoring system comprising a tire pressure monitoring receiver connected to at least one tire pressure monitoring sensor placed at the level of a tire of the vehicle, each tire pressure monitoring sensor being positioned in contact with the internal wall of the tire so as to be able to measure a variation in the radial acceleration when the tread facing which the tire pressure monitoring sensor is positioned comes into contact with the ground. The method comprises the following steps:
  at least two successive reference times are determined as a function of the variation with respect to time of the radial acceleration experienced by the tire pressure monitoring sensor,
  at least one instant of passage of a half-deflection angle is determined as a function of the variation with respect to time of the radial acceleration experienced by the tire pressure monitoring sensor, and of at least one reference time,
  the half-deflection angle is determined as a function of the instant of passage of the half-deflection angle and of the at least two successive reference times, then
  the value of a mean external radius, which radius is estimated in a range of angular positions, is determined as a function of a value for the speed or the acceleration of the vehicle, of the half-deflection angle and of the at least two successive reference times,
  a value of a mean internal radius, which radius is estimated in a range of angular positions, is determined as a function of the measurement of the radial acceleration and of the angular position of the tire pressure monitoring sensor, then
  the thickness of the tire is determined as being the difference between the mean external radius and the mean internal radius.

If a measurement of the speed of the vehicle is available, and when the relative variation in vehicle speed between two successive reference times is below a predetermined threshold, the following steps may be performed:
  a successive first reference time and second reference time are determined,
  the instant of passage of the half-deflection angle following the first reference time is determined as a function of the evolution, with respect to time, of the radial acceleration experienced by the tire pressure monitoring sensor of the tire,
  the half-deflection angle is determined as a function of the instant of passage of the half-deflection angle and of the reference times, then the mean external radius of the tire is determined as a function of the half-deflection angle, of the instant of passage of the half-deflection angle, and of the two reference times as well as the vehicle speed.

If a speed measurement is available and if at the same time the relative variation in vehicle speed between two successive reference times is greater than a threshold or if a speed measurement is not available, then a first reference time, a second reference time and a third reference time referred to as the time of passage are determined, these times being successive, and when, at the third reference instant, the absolute value of the longitudinal acceleration of the vehicle is below a predetermined threshold, and when the angle between the projection onto the horizontal plane of the velocity vector of the vehicle and the projection onto the horizontal plane of the velocity vector of the tire on which the sensor is installed is below a predefined threshold, the following steps may be performed:
  the instant of passage of the half-deflection angle following the second reference time is determined as a function of the evolution, with respect to time, of the radial acceleration experienced by the tire pressure monitoring sensor of the tire,
  the value of the half-deflection angle is determined as a function of the instant of passage of the half-deflection angle and of the reference times, then the value of the mean external radius is determined as a function of the half-deflection angle, of the reference times, and of the integral, with respect to time, of the longitudinal acceleration experienced by the vehicle between the second reference time and third reference time.

A reference time may be determined as being the instant situated in the middle of the time interval corresponding to a minimum value of the radial acceleration experienced by the tire pressure monitoring sensor.

The instant of passage of the half-deflection angle for a rotation can be defined as being the instant following the reference time for said rotation for which the radial acceleration experienced by the tire pressure monitoring sensor, filtered by a first-order low-pass filter, is equal to a minimum. It will be recalled that it is possible to determine that a parameter has reached a minimum by determining that the derivative of the magnitude has reached a null value following a decrease in the value of the parameter.

The cut-off frequency of the low-pass filter may be equal to 0.1 Hz.

The speed of the vehicle can be determined as a function of a global positioning signal.

The longitudinal acceleration of the vehicle can be determined as a function of the signal from an accelerometer.

An internal radius of the tire estimated over the range of angular positions can be determined as being equal to the integral, over a period of time corresponding to the range of angular positions, of the ratio of the radial acceleration of the tire pressure monitoring sensor and the derivative with respect to time of the angular position of the tire pressure monitoring system.

The range of angular positions may extend from the half-deflection angle in radians to $2\pi$ minus the half-deflection angle in radians.

BRIEF DESCRIPTION OF THE DRAWINGS

Other aspects, features and advantages of the invention will become apparent on reading the following description, given solely by way of nonlimiting example, and with reference to the appended drawings, in which.

DETAILED DESCRIPTION OF THE PREFERRED EMBODIMENTS

It will be recalled that a TPMS (Tire Pressure Monitoring System) according to the prior art comprises a TPMS receiver connected to at least one TPMS sensor arranged on a wheel of the vehicle. In general, each wheel of the vehicle is fitted with a TPMS sensor.

The TPMS system is also connected to a central item of equipment, notably an electronic control unit or electronic command unit ECU, or to a portable electronic device, notably a smartphone. The connection with the TPMS system may be wired or wireless (of the radio, Bluetooth, notably Bluetooth Low Energy type, or the like). However, connection to the vehicle TPMS sensors is wireless, for design and implementation reasons.

The TPMS sensors of the prior art are generally positioned in the tire at the level of the inflation valve or in contact with the internal wall of the tire facing the tread of the tire.

The inventors have noticed that the evolution with respect to time of the radial acceleration perceived by a TPMS sensor in contact with the internal wall facing the tread formed a characteristic signal known as the imprint ("footprint") from which it was possible to determine the morphological parameters of the tire and notably the mean internal radius thereof.

Thus, only TPMS sensors in contact with the internal wall of the tire make it possible to perceive the deformation or deflection of the tire on contact with the ground and therefrom to deduce the mean internal radius. One example of a TPMS sensor positioned on the internal wall of the tire facing the tread is Continental's TPMS-eTIS (Electronic tire Information System) sensor.

Figure 1:
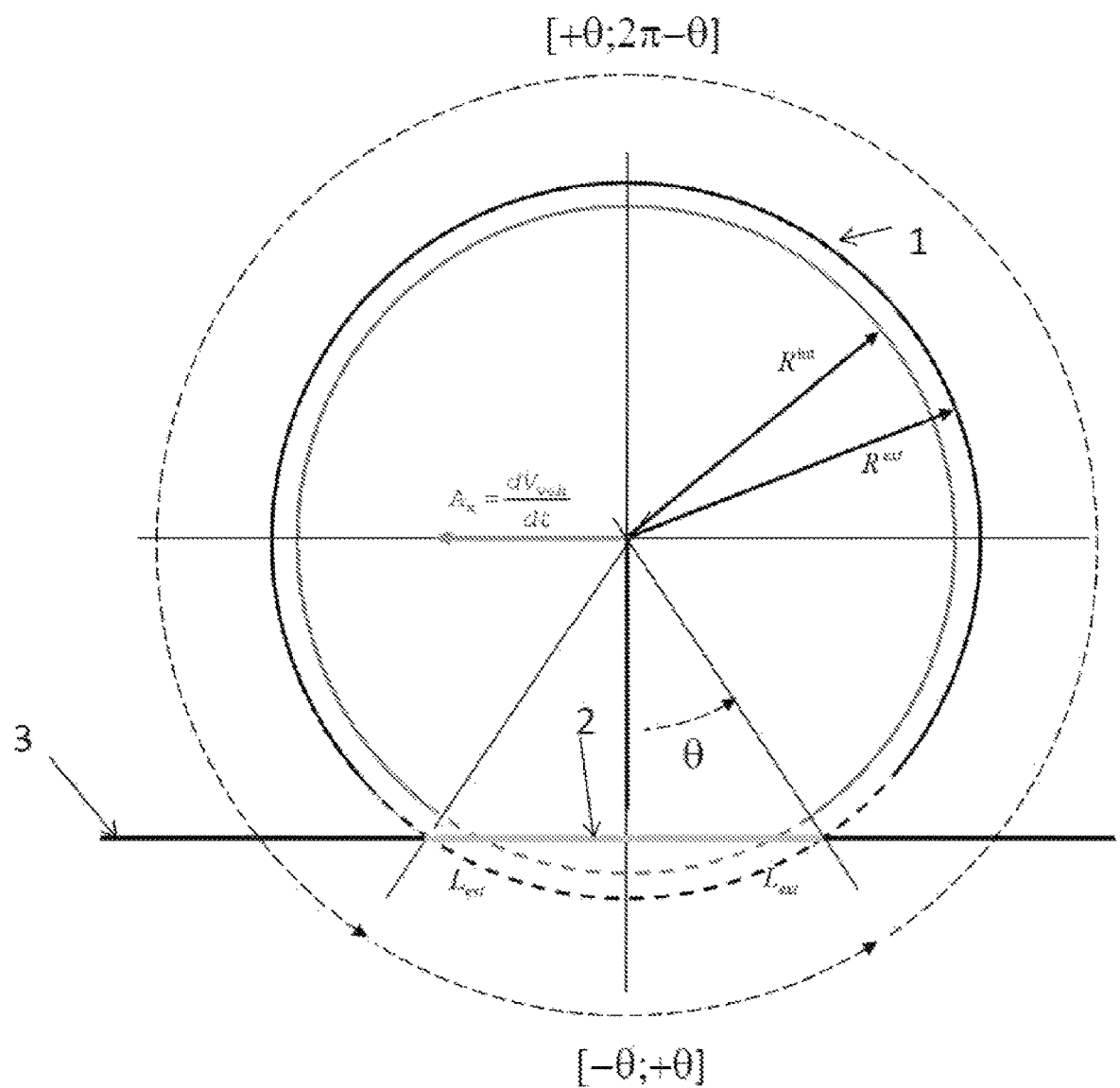
FIG. 1 illustrates the key characteristic parameters of a tire.

FIG. 1 schematically illustrates a tire 1 experiencing a deflection 2 in the lower part near the point of contact with the ground 3. The variables illustrated in FIG. 1 are defined as follows:

$A_x$: longitudinal acceleration of the vehicle [m/s²]
$\theta$: half deflection angle [rad]
$V_{veh}$: Longitudinal speed of the vehicle [m/s]
$R^{ext}$: Outside radius of the tire without deflection [m]
$L_{ext}$: External half-length of the deflection of the tire [m]

It may be seen that the deflection 2 zone extends over an angular interval $[-\theta;+\theta]$, whereas the zone outside of the deflection zone extends over the range of angular positions $[\theta;2\pi-\theta]$.

Figure 2:
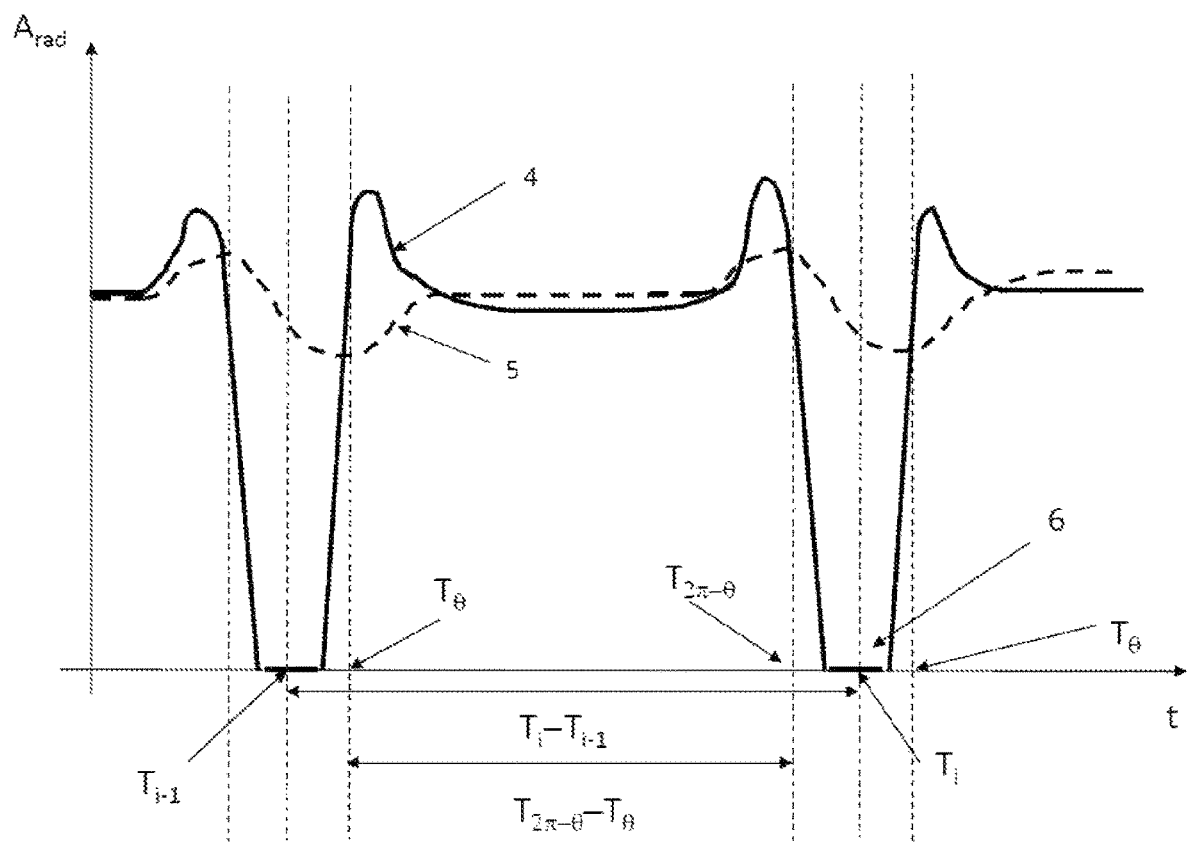
FIG. 2 illustrates a signal of the radial acceleration from the TPMS sensor of a tire, showing the imprint of the tire.

FIG. 2 illustrates a first signal 4 showing the evolution with respect to time of the radial acceleration $A_{rad}$ measured by a TPMS sensor as the wheel rotates, and a second signal 5 showing the evolution with respect to time of the value of the radial acceleration, filtered by a low-pass filter (for example having a cut-off frequency equal to 0.1 Hz).

Considering the first signal 4, it may be seen that the radial acceleration passes through non-zero values corresponding to the rotation of the TPMS sensor outside of the deflection zone illustrated in FIG. 1. When the TPMS sensor approaches the deflection zone, it experiences an increase in radial acceleration up to a local maximum. The radial acceleration on the TPMS sensor then decreases sharply until it reaches a minimum when the tread is facing the TPMS sensor and is in contact with the ground. The radial acceleration experienced by the TPMS sensor then increases again until it reaches another local maximum, to then decrease toward a non-zero value.

The radial acceleration profile described above is repeated for each revolution of the wheel upon contact between the tread situated facing the TPMS sensor, and the ground.

The following notable points can be defined on this profile:

According to one embodiment, the reference time $T_i$ for rotation i is defined as being the instant situated in the middle of the time interval 6 corresponding to a minimum radial acceleration $A_{rad}$ during the rotation i. The reference times for the other rotations are defined in a similar way.

According to another embodiment, the reference time $T_i$ for the rotation i is defined as being a notable point that can be determined repeatably from one rotation to the next.

Considering now the second signal 5, the instant $T_\theta$ of passage of the half-deflection angle $\theta$ is defined as being the instant following the reference time for which the value, filtered by a low-pass filter (for example having a cut-off frequency equal to 0.1 Hz), of the radial acceleration experienced by the TPMS sensor passes through a minimum.

It may also be seen that the instant $T_{2\pi-\theta}$ marking the start of the footprint for the reference instant Ti, like the instant preceding the reference time for which the value, filtered by a low-pass filter (for example having a cut-off frequency equal to 0.1 Hz), of the radial acceleration experienced by the TPMS sensor passes through a maximum.

In this same figure, it may be seen that the footprint for the reference timer Ti begins at the instant $T_{2\pi-\theta}$ and ends at the instant of passage of the half-deflection angle $T_\theta$.

It will be noted that the range of angular positions $[\theta;2\pi-\theta]$ outside of the deflection zone $[-\theta;+\theta]$ illustrated in FIG. 1 corresponds to the range of times $T_{2\pi-\theta}-T_\theta$ illustrated in FIG. 2.

Each reference time is followed by the assumption of there being an instant of passage $T_\theta$ of the half-deflection angle $\theta$.

The formal context in which the mean external radius of the tire is calculated will now be described.

The external perimeter P of the tire 1 is defined as a function of the half-deflection angle $\theta$, of the mean external radius of the tire $R^{ext}$ and of the external half-length of the deflection of the tire $L_{ext}$.

$$P(\vartheta) = 2L_{ext} + (2\pi - 2\vartheta)R^{ext} \quad \text{(Eq. 1)}$$

The determining of the half-deflection angle $\theta$ will be explained later on in the description.

Considering $T_i$ to be the reference phase time for the revolution i and assuming a dynamic condition without any slip, the speed of the vehicle can be expressed as follows $$\frac{V_{veh}(T_{i-1}) + V_{veh}(T_i)}{2} = \frac{P(\vartheta)}{(T_i - T_{i-1})} \quad \text{(Eq. 2)}$$

The mean external radius of the tire can then be determined according to whether the vehicle speed $V_{veh}$ is available, whether or not this speed is substantially constant, or whether it is only the longitudinal acceleration $A_x$ experienced by the vehicle that is available.

In one embodiment, the central control unit has means available for determining the vehicle speed $V_{veh}$, making it possible to determine the vehicle speed reliably and accurately. By way of example of such a determination, mention may be made of determination using a global positioning signal (Naystar GPS, GLONASS, BeiDou, Galileo, . . . ).

When the vehicle speed $V_{veh}$ is available, the mean external radius of the tire is determined as follows:

Equations Eq. 1 and Eq. 2 are combined to obtain the following equation:

$$\left(\frac{V_{veh}(T_i) + V_{veh}(T_{i-1})}{2}\right)(T_i - T_{i-1}) = (2L_{ext} + (2\pi - 2\vartheta)R^{ext}) \quad \text{(Eq. 3)}$$

It is assumed that the deflection half-length $L_{ext}$ can be rewritten as follows:

$$L_{ext} = \left(\frac{V_{veh}(T_i) + V_{veh}(T_{i-1})}{2}\right)(T_\vartheta - T_{i-1}) \quad \text{(Eq. 4)}$$

Equations Eq. 3 and Eq. 4 are then combined in order to obtain:

$$R^{ext} = \frac{\frac{(V_{veh}(T_i) + V_{veh}(T_{i-1}))}{2}\left[(T_i - T_{i-1}) - 2(T_\vartheta - T_{i-1})\right]}{2\pi - 2\vartheta} \quad \text{(Eq. 5)}$$

In another embodiment, the central control unit comprises means for determining the longitudinal acceleration of the vehicle, making it possible to determine the longitudinal acceleration of the vehicle reliably and accurately. By way of example of such a determination, mention may be made of determination using an accelerometer from an inertial unit of the vehicle or an accelerometer belonging to the portable electronic device.

When the longitudinal vehicle speed $V_{veh}$ is not available, and only the longitudinal acceleration $A_x$ is available, the mean external radius $R^{ext}$ of the tire is determined as follows. This determination is used also if a speed measurement is available but the relative variation in vehicle speed between two successive reference times is above a threshold value.

The variation between two instants $T_i$ and $T_{i-1}$ of the equation Eq. 2 is determined by considering the perimeter $P^i(\vartheta) = P^{i-1}(\vartheta)$ as being constant between these two instants $T_i$ and $T_{i-1}$ by applying the following equation:

$$\frac{V_{veh}(T_i) - V_{veh}(T_{i-2})}{2} = \left[\frac{P^i(\vartheta)}{(T_i - T_{i-1})} - \frac{P^i(\vartheta)}{(T_{i-1} - T_{i-2})}\right] \quad \text{(Eq. 6)}$$

It is then possible to write:

$$P^i(\vartheta) = 2\left(\frac{V_{veh}(T_i) + V_{veh}(T_{i-2})}{2}\right)\Delta T_\vartheta^i + (2\pi - 2\vartheta)R^{ext} \quad \text{(Eq. 7)}$$

$$P^{i-1}(\vartheta) = 2\left(\frac{V_{veh}(T_{i-1}) + V_{veh}(T_{i-2})}{2}\right)\Delta T_\vartheta^{i-1} + (2\pi - 2\vartheta)R^{ext}$$

Over two revolutions of a wheel, the following assumption is made:

$$FP_{ratio} = \frac{\Delta T_\vartheta^i}{(T_i - T_{i-1})} = \frac{\Delta T_\vartheta^{i-1}}{(T_{i-1} - T_{i-2})} = \frac{(T_\vartheta - T_{i-1})}{(T_i - T_{i-1})} \quad \text{(Eq. 8)}$$

where:
FPratio: is the ratio between the time needed to cover the half-deflection angle with respect to the time needed to accomplish one revolution of the wheel.

Equations Eq. 1, Eq. 6, Eq. 7 and Eq. 8 are then combined in order to introduce the mean external radius $R^{ext}$:

$$V_{veh}(T_i) - V_{veh}(T_{i-2}) = \frac{2[(2\pi - 2\vartheta)R^{ext}]\left[\frac{1}{(T_i - T_{i-1})} - \frac{1}{(T_{i-1} - T_{i-2})}\right]}{1 - 2FP_{ratio}} \quad \text{(Eq. 9)}$$

Equation Eq. 9 is then written to show that the variation in the vehicle speed $V_{veh}$ between two instants is equal to the integral of the longitudinal acceleration $A_x$ between these two instants, when the angle between the projection onto the horizontal plane of the vehicle velocity vector and the projection onto the horizontal plane of the velocity vector of the tire on which the sensor is installed is below a predefined threshold, for example 5° of steering angle. The terms are also grouped together so that the expression can be integrated.

$$\int_{T_{i-1}}^{T_i} A_x(t)dt = \frac{2[(2\pi - 2\vartheta)R^{ext}]\left[\frac{1}{(T_i - T_{i-1})} - \frac{1}{(T_{i-1} - T_{i-2})}\right]}{1 - 2FP_{ratio}} \quad \text{(Eq. 10)}$$

Equation Eq. 10 can then be reformulated to reveal the mean external radius $R^{ext}$:

$$R^{ext} = \frac{\frac{(T_{i-1} - T_{i-2})(T_i - T_{i-1})}{2[(T_{i-1} - T_{i-2}) - (T_i - T_{i-1})]}[1 - 2FP_{ratio}] \int_{T_{i-1}}^{T_i} A_x(t)dt}{(2\pi - 2\vartheta)} \quad \text{(Eq. 11)}$$

The way in which the half-deflection angle θ, which is a point of reference for the radial acceleration in the phase domain, is determined will now be described.

If the vehicle is moving at a constant speed, namely if the acceleration of the vehicle is below a threshold value, for example 0.05 m/s², the half-deflection angle θ is calculated as follows:

$$\vartheta = 2\pi \times FP_{ratio} \quad \text{(Eq. 12)}$$

If the vehicle is experiencing longitudinal acceleration the relative variation of which is below a predefined threshold, for example equal to 0.05 m/s², namely if the variation in speed is substantially linear, the half-deflection angle θ can be estimated as follows.

On the basis of an observation over two revolutions of the wheel it is possible to determine a quadratic variation in the phase and a linear variation in the frequency of the rotation of the wheel with respect to time.

The angular function based on the point of reference for the radial acceleration is defined as follows:

$$\alpha(t) = 2\pi \lfloor a \cdot t^2 + b \cdot t + c \rfloor \quad \text{(Eq. 13)}$$

It is then possible to define a system of equations that take account of the changing angle for the three instants $T_{i-2}$, $T_{i-1}$ and $T_i$:

$$\begin{cases} \alpha(T_i) = 2\pi[a.T_i^2 + b.T_i + c] \\ \alpha(T_{i-1}) = 2\pi[a.T_{i-1}^2 + b.T_{i-1} + c] \\ \alpha(T_{i-2}) = 2\pi[a.T_{i-2}^2 + b.T_{i-2} + c] \end{cases} \quad \text{(Eq. 14)}$$

The system of equations Eq. 14 can then be reformulated to obtain the system of equations Eq. 15 below, by considering that, between each instant $T_{i-2}$, $T_{i-1}$ and $T_i$ the phase has changed by 2π. In other terms, if the angle $\alpha(T_{i-2})$ is considered to be the reference angle and equal to zero, the angle $\alpha(T_{i-1})$ corresponds to 2π and the angle $\alpha(T_i)$ to 4π.

$$\begin{Bmatrix} 2 \\ 1 \\ 0 \end{Bmatrix} = \begin{bmatrix} T_i^2 & T_i & 1 \\ T_{i-1}^2 & T_{i-1} & 1 \\ T_{i-2}^2 & T_{i-2} & 1 \end{bmatrix} \begin{Bmatrix} a \\ b \\ c \end{Bmatrix} \quad \text{(Eq. 15)}$$

If the instant $T_{i-2}$ is considered as being the time reference, then the system of equations Eq. 15 can be rewritten as follows:

$$\begin{Bmatrix} 2 \\ 1 \\ 0 \end{Bmatrix} = \begin{bmatrix} (T_i - T_{i-2})^2 & T_i - T_{i-2} & 1 \\ (T_{i-1} - Y_{i-2})^2 & T_{i-1} - T_{i-2} & 1 \\ 0 & 0 & 1 \end{bmatrix} \begin{Bmatrix} a \\ b \\ c \end{Bmatrix} \quad \text{(Eq. 16)}$$

Namely:

$$\begin{Bmatrix} a \\ b \end{Bmatrix} = \begin{bmatrix} (T_i - T_{i-2})^2 & T_i - T_{i-2} \\ (T_{i-1} - T_{i-2})^2 & T_{i-1} - T_{i-2} \end{bmatrix}^{-1} \begin{Bmatrix} 2 \\ 1 \end{Bmatrix} \quad \text{(Eq. 17)}$$

because $c = 0$

From equation Eq. 13 applied at the instant $T_\theta$ and for a zero value for c as determined in equation Eq. 17, this gives:

$$\vartheta = \alpha(T_\vartheta - T_{i-2}) = 2\pi[a \cdot (T_\vartheta - T_{i-2})^2 + b \cdot (T_\vartheta - T_{i-2})] \quad \text{(Eq. 18)}$$

Where a and b are two coefficients defined by the system of equations Eq. 17 and functions of the reference instants $T_{i-2}$, $T_{i-1}$ and $T_i$.

The determination of the mean internal radius of the tire will now be described.

The radial acceleration $A_{rad}$ measured by the eTIS TPMS sensor as a function of the angular function α(t) and of the mean internal radius of the tire $R^{int}$ can be approximated as follows in the range of angular positions [$\vartheta$ ; $2\pi - \vartheta$]:

$$A_{rad}(t) = \gamma_z \cos(\vartheta(t)) + \gamma_x \sin(\vartheta(t)) + \ddot{R}^{int}(t) - \left(\frac{d\vartheta(t)}{dt}\right)^2 R^{int}(t) \quad \text{(Eq. 19)}$$

This expression includes the contribution of the vertical component of the radial acceleration $\gamma_z$ applied to the wheel and of the horizontal component of the radial acceleration $\gamma_x$ applied to the wheel as well as a quadratic evolution of the acceleration as a function of the angular velocity and of the internal radius $R^{int}$.

A person skilled in the art will note that the horizontal component of the radial acceleration $\gamma_x$ applied to the wheel does not coincide with the longitudinal acceleration $A_x$ experienced by the vehicle for small steering angles, notably smaller than 5° of angle.

Furthermore, the terms cos(a (t)) and sin(a (t)) reciprocally correspond to a projection of the vertical component $\gamma_z$ of the radial acceleration applied to the wheel and to a projection of the horizontal component $\gamma_x$ of the radial acceleration applied to the wheel onto the radial measurement direction of the eTIS TPMS sensor.

In order to extract the mean internal radius of the tire, estimated over the range of angular positions [$\vartheta$ ; $2\pi - \vartheta$], the following approximation is made:

$$R^{int}(t) = \frac{|A_{rad}(t)|}{\left(\frac{d\vartheta(t)}{dt}\right)^2} \quad \text{(Eq. 20)}$$

The internal perimeter of the tire over the range of angular positions [$\vartheta$ ; $2\pi - \vartheta$] is defined by:

$$P^{perim}_{[\vartheta, 2\pi - \vartheta]} = \int_{t_r}^{t_{r+r}} \sqrt{\left(\frac{d\vartheta(t)}{dt} R^{int}(t)\right)^2 + \left(\frac{dR^{int}(t)}{dt}\right)^2} \, dt \quad \text{(Eq. 21)}$$

By making the following approximation:

$$\left(\frac{d\vartheta(t)}{dt} R^{int}(t)\right)^2 \gg \left(\frac{dR^{int}}{dt}\right)^2 \quad \text{(Eq. 22)}$$

By combining equations Eq. 22 and Eq. 21, the following expression is obtained:

$$P^{perim}_{[\vartheta, 2\pi - \vartheta]} = \int_{t_r}^{t_{r+r}} \left(\frac{d\vartheta(t)}{dt} R^{int}(t)\right) dt \quad \text{(Eq. 23)}$$

By combining equations Eq. 20 and Eq. 23, the following expression is obtained:

$$R_{int} = \frac{E\{\hat{\theta}, 2\pi - \hat{\theta}\}}{2\pi - 2\vartheta} = \frac{1}{2\pi - 2\vartheta} \int_{\hat{\theta}}^{2\pi - \hat{\theta}} \left( \frac{A_{rad}(t)}{\left(\frac{d\vartheta(t)}{dt}\right)} \right) dt \quad \text{(Eq. 24)}$$

The thickness of the tire is defined as being the difference between the estimate of the mean external radius determined by application of equations Eq. 5 and Eq. 11 and the estimate of the mean internal radius determined by application of equation Eq. 24.

The relative variation in thickness of the tire is defined as being the ratio between the thickness of the tire as estimated at a given instant and the thickness of the tire estimated at a later date.

The method for determining the thickness of a tire comprises the following steps:

Determining whether a speed measurement is available.

If one is, the reference times and $T_{i-1}$ and the instant $T_\theta$ of passage of the half-deflection angle θ following the reference time is determined as a function of the change, with respect to time, of the radial acceleration experienced by the TPMS sensor of the tire.

When the variation in vehicle speed at the reference time $T_i$ is below a predetermined threshold value, the half-deflection angle θ is determined using equations Eq. 12 and the mean external radius of the tire is then determined by application of equation Eq. 5.

If the variation in vehicle speed is above the predetermined threshold value, or if the vehicle speed is not available, use is made of a longitudinal accelerometer, and the reference times $T_{i-2}$, $T_{i-1}$ and $T_i$ and the instant $T_\theta$ of passage of the half-deflection angle θ following the reference time are determined as a function of the change, with respect to time, of the radial acceleration experienced by the TPMS sensor of the tire.

More specifically, when the absolute value of the longitudinal acceleration $A_x$ of the vehicle at the reference instant $T_i$ is below a threshold value, for example 0.05 m/s$^2$, and at the same time the angle between the projection onto the horizontal plane of the vehicle velocity vector and the projection onto the horizontal plane of the speed vector of the tire on which the sensor is installed is below a predefined threshold, for example 5° of steering angle, the value of the half-deflection angle θ is determined by applying equation Eq. 18 and the value for the mean external radius of the tire is determined by application of equation Eq. 11.

For rotation i, the reference time $T_i$ is determined as being the instant situated in the middle of the time interval corresponding to a minimum value of the radial acceleration experienced by the TPMS sensor.

The instant $T_\theta$ of passage of the half-deflection angle θ is defined as being the instant following the reference time $T_{i-1}$ for which the filtering of the radial acceleration experienced by the TPMS sensor by a first-order low-pass filter (having, for example, a cut-off frequency equal to 0.1 Hz) is equal to a minimum.

A mean internal radius of the tire is then determined as a function of the integral of the ratio between the radial acceleration and the derivative, with respect to time, of the angular position of the tire pressure monitoring sensor over the range of angular positions extending outside of the range of angular positions corresponding to the footprint, by applying equation Eq. 24.

The method ends with determining the thickness of the tire as being the difference between the mean external radius and the mean internal radius.

The invention claimed is:

1. A method for determining the thickness of a tire of a motor vehicle, the motor vehicle being equipped with a tire pressure monitoring system comprising a tire pressure monitoring receiver connected to at least one tire pressure monitoring sensor placed at a level of a tire of the vehicle, each tire pressure monitoring sensor being positioned in contact with an internal wall of the tire so as to be able to measure a variation in the radial acceleration when the tread facing which the tire pressure monitoring sensor is positioned is brought into contact with the ground, the method comprising:

at least two successive reference times are determined as a function of the variation with respect to time of the radial acceleration experienced by the tire pressure monitoring sensor, at least one instant of passage of a half-deflection angle is determined as a function of the variation with respect to time of the radial acceleration experienced by the tire pressure monitoring sensor, and of at least one reference time, the half-deflection angle is determined as a function of the instant of passage of the half-deflection angle and of the at least two successive reference times, then the value of a mean external radius, which radius is estimated in a range of angular positions, is determined as a function of a value for the speed or the acceleration of the vehicle, of the half-deflection angle and of the at least two successive reference times, a value of a mean internal radius, which radius is estimated in a range of angular positions, is determined as a function of the measurement of the radial acceleration and of the angular position of the tire pressure monitoring sensor, then the thickness of the tire is determined as being a difference between the mean external radius and the mean internal radius.

2. The method as claimed in claim 1, wherein, if a measurement of the speed of the vehicle is available, and when the relative variation in vehicle speed between two successive reference times is below a predetermined threshold, a successive first reference time and second reference time are determined, the instant of passage of the half-deflection angle following the first reference time is determined as a function of the evolution, with respect to time, of the radial acceleration experienced by the tire pressure monitoring sensor of the tire, and the half-deflection angle is determined as a function of the instant of passage of the half-deflection angle and of the two reference times, then the mean external radius of the tire is determined as a function of the half-deflection angle, of the instant of passage of the half-deflection angle, and of the two reference times as well as the vehicle speed.

3. The method as claimed in claim 1, wherein if a speed measurement is available and if at the same time the relative variation in vehicle speed between two successive reference times is greater than a threshold or if a speed measurement is not available, then a first reference time, a second reference time and a third time of passage are determined, these times being successive, and when, at the third reference instant, the absolute value of the longitudinal acceleration of the vehicle is below a predetermined threshold, and when the angle between the projection onto the horizontal plane of the velocity vector of the vehicle and the projection onto the horizontal plane of the velocity vector of the tire on which the sensor is installed is below a predefined threshold, the instant of passage of the half-deflection angle following the second reference time is determined as a function of the evolution, with respect to time, of the radial acceleration experienced by the tire pressure monitoring sensor of the tire, and the value of the half-deflection angle is determined as a function of the instant of passage of the half-deflection angle and of the reference times, then the value of the mean external radius as a function of the half-deflection angle, of the reference times, and of the integral, with respect to time, of the longitudinal acceleration experienced by the vehicle between the second reference time and third reference time is determined.

4. The method as claimed in claim 1, wherein a reference time is determined as being the instant situated in a middle of the time interval corresponding to a minimum value of the radial acceleration experienced by the tire pressure monitoring sensor.

5. The method as claimed in claim 1, wherein the instant of passage of the half-deflection angle for a rotation is defined as being the instant following the reference time for said rotation for which the radial acceleration experienced by the tire pressure monitoring sensor, filtered by a first-order low-pass filter, is equal to a minimum.

6. The method as claimed in claim 5, wherein the cut-off frequency of the low-pass filter is equal to 0.1 Hz.

7. The method as claimed in claim 1, wherein the speed of the vehicle is determined as a function of a global positioning system signal.

8. The method as claimed in claim 1, wherein the longitudinal acceleration of the vehicle is determined as a function of the signal from an accelerometer.

9. The method as claimed in claim 1, wherein an internal radius of the tire estimated over the range of angular positions is determined as being equal to the integral, over a period of time corresponding to the range of angular positions of the ratio between the radial acceleration of the tire pressure monitoring sensor and the derivative with respect to time of the angular position of the tire pressure monitoring sensor.

10. The method as claimed in claim 1, wherein the range of angular positions extends from the half-deflection angle in radians to $2\pi$ minus the half-deflection angle in radians.

11. The method as claimed in claim 2, wherein if a speed measurement is available and if at the same time the relative variation in vehicle speed between two successive reference times is greater than a threshold or if a speed measurement is not available, then a first reference time, a second reference time and a third time of passage are determined, these times being successive, and when, at the third reference instant, the absolute value of the longitudinal acceleration of the vehicle is below a predetermined threshold, and when the angle between the projection onto the horizontal plane of the velocity vector of the vehicle and the projection onto the horizontal plane of the velocity vector of the tire on which the sensor is installed is below a predefined threshold, the instant of passage of the half-deflection angle following the second reference time is determined as a function of the evolution, with respect to time, of the radial acceleration experienced by the tire pressure monitoring sensor of the tire, and the value of the half-deflection angle is determined as a function of the instant of passage of the half-deflection angle and of the reference times, then the value of the mean external radius as a function of the half-deflection angle, of the reference times, and of the integral, with respect to time, of the longitudinal acceleration experienced by the vehicle between the second reference time and third reference time is determined.

\* \* \* \* \*